Figure 1:
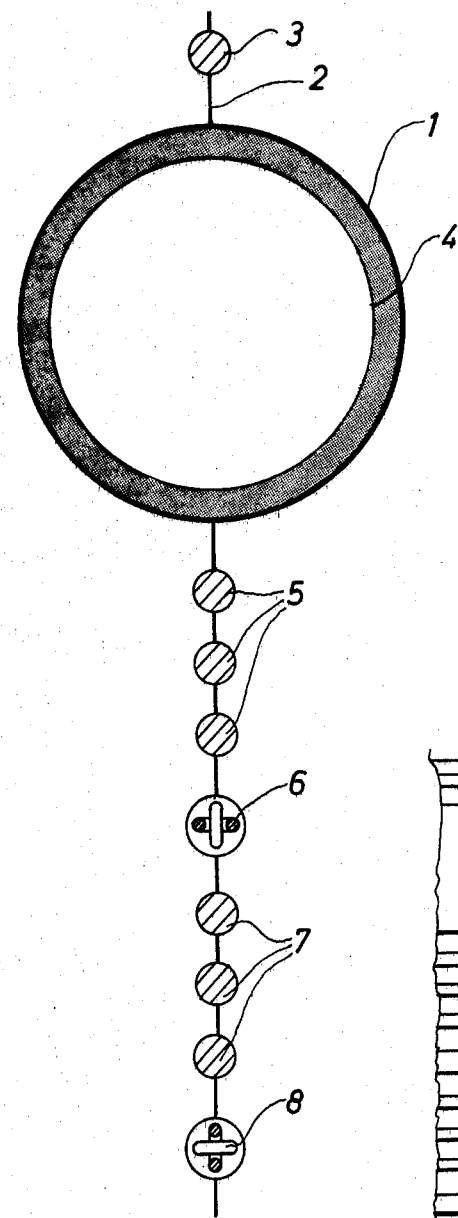

United States Patent [19]

Hallhagen

[11] 4,084,380
[45] Apr. 18, 1978

[54] OIL FENCE

[75] Inventor: Rudolf G. Hallhagen, Goteborg, Sweden

[73] Assignee: AB Sjuntorp, Sjuntorp, Sweden

[21] Appl. No.: 692,282

[22] Filed: Jun. 3, 1976

[51] Int. Cl.² .............................................. E02B 15/04
[52] U.S. Cl. ........................................................ 61/1 F
[58] Field of Search ..................... 61/1 F, 5; 210/352

[56] References Cited

U.S. PATENT DOCUMENTS

| 3,321,923 | 5/1967 | Smith et al. | 61/1 F |
| 3,494,132 | 2/1970 | Logan | 61/1 F |
| 3,691,773 | 9/1972 | Ruhlman | 61/1 F |
| 3,783,622 | 1/1974 | Gambel | 61/1 F |
| 3,803,848 | 4/1974 | Van't Hof | 61/1 F |
| 3,848,417 | 11/1974 | Smith | 61/1 F |
| 3,922,861 | 12/1975 | Grihangne | 61/1 F |
| 3,973,406 | 8/1976 | Casey | 61/1 F |

Primary Examiner—Jacob Shapiro

[57] ABSTRACT

Oil fence especially adapted for the defining of impurities on a water surface and made of a web of cloth shaped material. The web exhibits alternating connected portions and multiple layer portions made in such a manner that between the layers of the multiple layer portions pockets and/or channels are formed, which are defined by the single layer portions, in order to receive for one thing float bodies for the support of the oil fence in water, and for another thing sinking weights in order to give the oil fence the intended upright position in the water. The present cloth shaped web comprises a preferably impregnated and/or coated textile material, which is woven with alternating single layer portions forming said connected portions and portions with at least two layers, between which said pockets and/or channels are formed. The single layer portions are by means of a per se known weaving technique shaped from the interwoven weft of the converging layers of the adjacent multiple layer portions, thereby obtaining an extremely strong connection of said portions.

5 Claims, 6 Drawing Figures

U.S. Patent     April 18, 1978     Sheet 1 of 3     4,084,380

OIL FENCE

The present invention relates to an oil fence especially adapted for the defining of impurities on a water surface and made of a web of cloth shaped material exhibiting alternating connected portions and multiple layer portions made in such a manner that between the layers of the multiple layer portions pockets and/or channels are formed, which are defined by the single layer portions, in order to receive for one thing float bodies for the support of the oil fence in water, and for another thing sinking weights in order to give the oil fence the intended upright position in the water.

Types of oil fences of the prior art are known, which have the common characteristic that they are made of a cloth material with pockets and/or channels. These pockets and/or channels are for one thing intended to provide accomodation for means for the suspension of the fence in water as for example float bodies or an air filling and for another thing sinking-weights in order to make it possible for the fence to occupy an upright position in the water. In connection with the types of fences of the prior art the pockets and/or channels mentioned have been arranged in such a manner that a cloth material of several layers has been connected along defined portions, whereby the pockets and/or channels have been shaped between these portions. In order to connect the different layers of the material one has used seams, glueing, vulcanizing or thermal welding depending upon what material that had been used in the fences. However, all these methods of connection have turned out to be not very reliable, and repeated averages have taken place due to the joints having yielded or the material by the influence of the joint having been torn to pieces close to the same.

It is an object of the present invention to provide an oil fence of the type mentioned made of a cloth material with pockets and/or channels, which material exhibits a considerably increased strength against being torn apart compared to oil fences of the prior art made by joining together several layers of a cloth material.

The object of the present invention is obtained by means of a fence which is characterized by said cloth shaped web comprising a preferably impregnated and/or coated textile material, which is woven with alternating single layer portions forming said connected portions, and portions with at least two layers, between which said pockets and/or channels are formed, the single layer portions by means of a per se known woven technique being shaped from the interwoven weft of the converging layers of the adjacent multiple layer portions.

Figure 2:
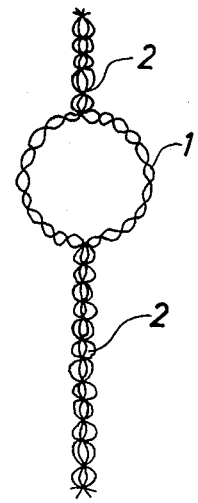
Figure 3:
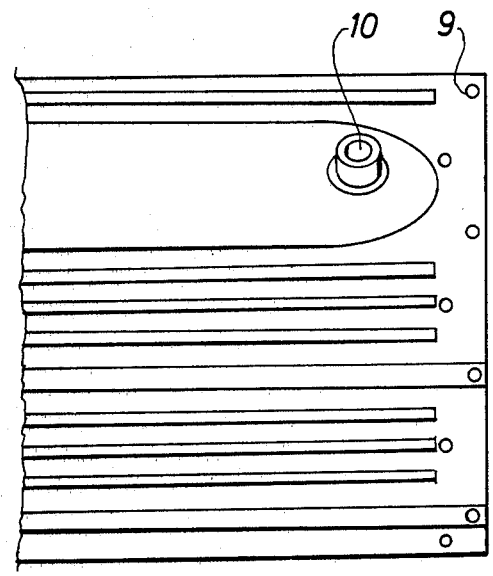
Figure 4:
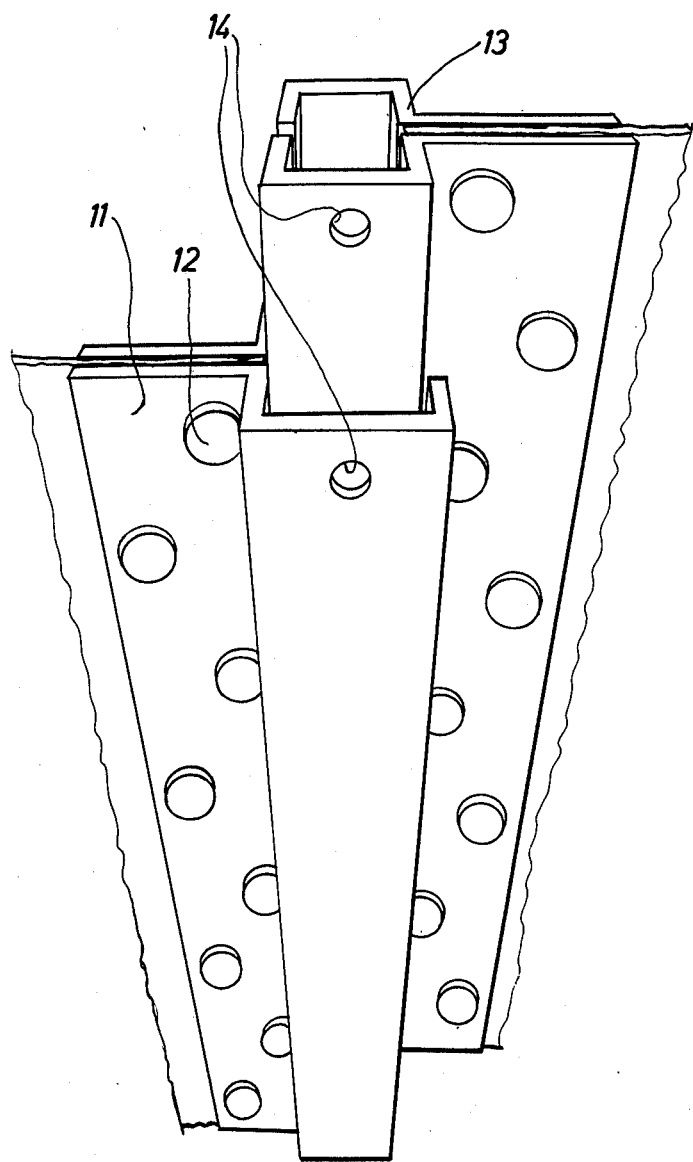
Figure 5:
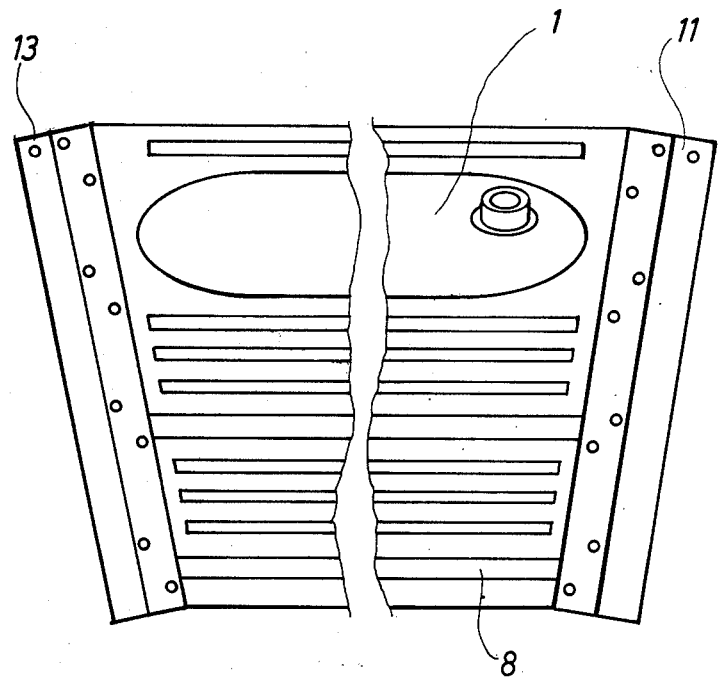
Figure 6:
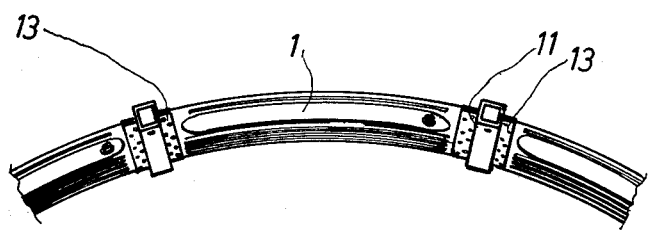

The invention will now be described more in detail in connection with two examples of embodiment of the same, reference being made to the accompanying drawings, in which FIG. 1 is a vertical cross-sectional view of the oil fence according to the first embodiment of the invention, FIG. 2 schematically shows the build-up of the cloth material of the oil fence, FIG. 3 is a side elevational view of one end of the oil fence, FIG. 4 is a perspective view of a coupling means, and the FIGS. 5 and 6 illustrate the second embodiment of the oil fence in side elevational and perspective view respectively.

According to the figures the oil fence comprises a web of cloth material which exhibits longitudinally extending portions 1 of double layer material and intermediate portions 2 of single layer material pieces. The portions 1 shape channels, which enclose for one thing means for the suspension of the oil fence in the water, and for another thing means for making its lower portion heavy, so that the oil fence will occupy an upright position in the water, its upper portion forming a barrage above the surface. According to FIG. 1 an upper portion encloses a float body 3 of foam material of circular cross-section. An underlying great channel encloses a hose 4, which in the condition of use is filled with air. The wall close to the hose 4 exhibits a relatively thick layer of foam material of floating property. In connection therewith a tight hose of cloth material coated with synthetic rubber on its outer or inner surface can be provided with a layer of foam material. The hose 4 is adapted to float at a high level at the surface and form the barrage mentioned, and below the same a skirt is suspended. The three uppermost channels of the skirt located nearest to the hose 4 enclose float bodies 5 of foam material, the channel following next encloses a sinking-weight 6 in the shape of a chain, whereafter three channels with float bodies 7 follow of the same kind as the float bodies 5, whereafter the skirt terminates with a sinking-weight 8 in the shape of a chain or lead weight.

The web 1, 2 comprises a woven textile material. According to the invention the textile web is made utilizing a type of circular weaving technique, so that the single layer portions 2, in which the double layer portions 1 converge, are formed by interweaving the weft of the double layer portions 1 into one single layer of cloth. Any special joining operations as seaming or glueing are thus not necessary, and one obtains a very strong piece of material, the strength of which is proportional to the textile material used, and which does not exhibit any joints or seams. The textile web manufactured according to this method is impregnated and/or coated with an oil resistant rubber of plastics, the double layer portions 1 still being separated.

As is evident from FIG. 3 the oil fence terminates with a joining together of the double layer portions 1, so that channels are shaped, which are closed at the ends.

The terminal boarders at the two ends of the oil fence are provided with eyelets 9 in zigzag arrangement. The hose 4 at a suitable location at each one of its ends is provided with a valve 10 for filling and evacuation of air. Alternatively a filling valve combined with a special zip fastener for rapid evacuation can be provided.

The second embodiment of the oil fence is illustrated in FIG. 5. The difference between this embodiment relative to the first embodiment consists in the ends of the oil fence having been cut down, so that the terminal borders converge away from each other in upwards direction counted towards the float body 3. This means that the perfiles 11 and 13 diverge in the same manner. By this arrangement one obtains that, in case of several oil fences being coupled together one after the other, they will form a curved wall with its lower edge pointing in inwards direction towards the center of the arc thus shaped. This arrangement gives the oil fence a better effect when collecting impurities of the water inside the inwards pointing curved wall of the oil fence.

The shape which the oil fence will take is schematically shown in a perspective view in FIG. 6.

Said shape of the oil fence can also be brought about by means of intermediate pieces of triangular or parallel trapeziform shape, which pieces occupy a position between oil fences, which are coupled together and comprise fences of the type of the first embodiment illustrated in FIG. 3. Said intermediate pieces shall have their base pointing upwards in such connection.

As is evident from FIG. 4, the terminal borders of the oil fence are provided with connecting means comprising sheet metal perfiles. If two oil fences are going to be coupled together, the end of one of the fences is provided with perfiles 11, which are connected together by means of for example rivets 12, which extend through the eyelets 9, the perfiles 11 shaping an outwards open chute. The end of the other oil fence is provided with similar but somewhat smaller perfiles 13, which together form a tubular body, which can be introduced into the chute shaped by the perfiles 11. The portion of the perfiles 13 immediately connecting to the very cloth material of the oil fence then extend out through the opening of the chute. The chute shaped by the perfiles 11 is provided with a bottom, so that the body shaped by the perfiles 13 can be introduced into the chute but not pass through the same. In addition the perfiles exhibit a hole 14, which in connected condition of the perfiles extends through their walls and can be provided with a coupling organ, by way of example a snap hook. The perfiles 11, 13 are also suitable for by way of example supporting shackless serving the purpose of fixing towing ropes or similar.

The cooperation between the float bodies 3, 4, 5, 7 and the sinking-weights 6, 8 is adjusted in such a manner that under operating conditions the skirt underneath the air filled hose 4 occupies an upright position. The lifting power of the float bodies is adpated in such a manner relative to the sinking power of the weights that the remaining floating power is sufficient to keep the oil fence afloat, even if the inflatable hose 4 should not be filled with air. This is of great advantage in case of a puncture of the hose 4 taking-place, and it also brings in its train the possibility to lay out the oil fence without filling air, which is the most simple way of doing it, with the purpose only after its being laid out to fill it with air in which connection the upper portion equipped with the hose 4 forms said defining barrage in the water.

The sinking weights 6 and 8 are arranged one above the other in the skirt of the oil fence in such a manner that a double pendulum is formed. Therefore if wave motion tends to displace the skirt with a movement in a certain direction, the lower sinking weight 8 will make a throw in this direction, which results in a movement in the opposite direction by the weight 6. Thereby the angle of deflection in connection with a certain subjecting force will be limited in an advantageous manner.

If so desired, the oil fence can be designed as a radar reflector, either by the hose 4 being made of or provided with inserts of radar reflecting material, by way of example metallized polyester foil or by metal wires being incorporated into the woven structure of the cloth material 1, 2 at least in the one portion, which is intended to be above the surface of the water.

I claim:

1. Oil fence adapted for the defining of impurities on a water surface, comprising an elongated web of preferably impregnated fabric forming a first portion stretching in the longitudinal direction of the web at a first border of the same and comprising double layers of fabric separated from each other and extending about a floating body, at least one second portion stretching in the longitudinal direction of the web at a second border of the same and comprising separate double layers of fabric and containing sinking weights, and at least one third portion between the first and the second portions comprising a single layer of fabric, said fabric being a woven textile material in one single piece forming said double and single layers, the threads weft of which in the double layers of the first and second portions being divided into two groups, each one forming one layer and in the single layer of the third portion the threads of the weft being interwoven with each other to form an integrated single layer.

2. Oil fence according to claim 1, wherein the first portion encloses an inflatable hose.

3. Oil fence according to claim 1, wherein two second portions are provided, each one containing sinking weights and together forming a double pendulum.

4. Oil fence adapted for the defining of impurities on a water surface, comprising an elongated web of preferably impregnated fabric forming a first portion stretching in the longitudinal direction of the web at a first border of the same and comprising double layers of fabric separated from each other and extending about a floating body, at least one second portion stretching in the longitudinal direction of the web at a second border of the same and comprising separate double layers of fabric and containing sinking weights, and at least one third portion between the first and the second portions comprising a single layer of fabric, said first portion enclosing an inflatable hose having a wall of a cellular material with a floating property of sufficient buoyancy to alone keep the oil fence afloat even if the inflatable body is evacuated.

5. Oil fence adapted for the defining of impurities on a water surface, comprising an elongaged web of preferably impregnated fabric forming a first portion stretching in the longitudinal direction of the web at a first border of the same and comprising double layers of fabric separated from each other and extending about a floating body, at least one second portion stretching in the longitudinal direction of the web at a second border of the same and comprising separate double layers of fabric and containing sinking weights, and at least one third portion between the first and the second portions comprising a single layer of fabric, the short ends of the elongated web being provided with coupling means arranged to couple said ends to another fence, and the length along the web between the coupling means at the first border being longer than the length between the coupling means at the second border so that the oil fence will form a conical wall when coupled to other fences.

* * * * *